UNITED STATES PATENT OFFICE.

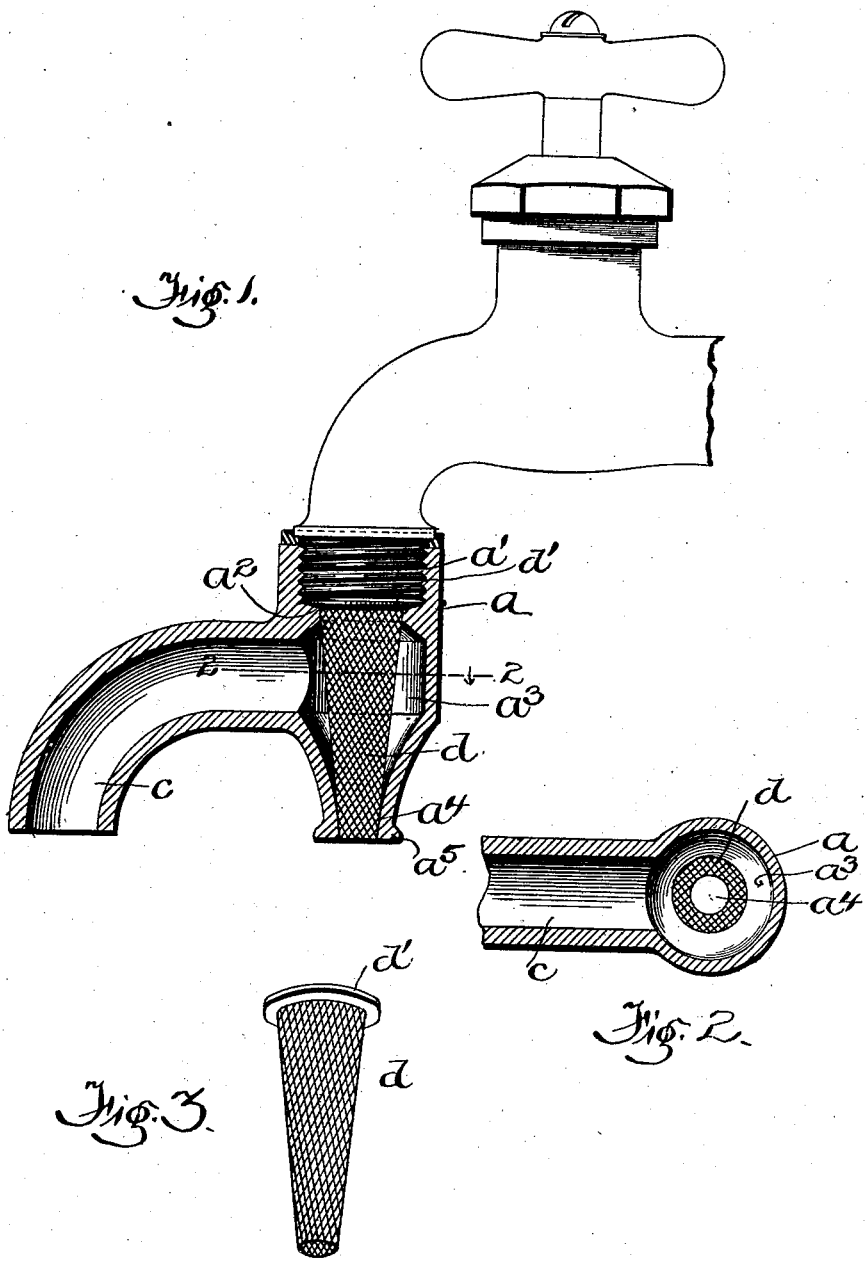

GEORGE SCHOLL, OF SOUTH FRAMINGHAM, MASSACHUSETTS, ASSIGNOR TO WILLIAM E. GALLAGHER, OF SOUTH FRAMINGHAM, MASSACHUSETTS.

FILTER.

SPECIFICATION forming part of Letters Patent No. 711,535, dated October 21, 1902.

Application filed February 7, 1902. Serial No. 92,970. (No model.)

*To all whom it may concern:*

Be it known that I, GEORGE SCHOLL, of South Framingham, in the county of Middlesex and State of Massachusetts, have invented certain new and useful Improvements in Filters, of which the following is a specification.

This invention relates to self-cleaning filters, or those in which the sediment arrested by the filtering material is continuously removed by the action of the liquid passing through the filter, thus avoiding liability of clogging or choking the said filtering material.

The invention has for its object to provide an efficient and durable filter of simple construction, the parts of which can be readily assembled and separated.

The invention consists in the improvements which I will now proceed to describe and claim.

Of the accompanying drawings, forming a part of this specification, Figure 1 represents a sectional view of my improved filter applied to a faucet. Fig. 2 represents a section on line 2 2 of Fig. 1. Fig. 3 represents a perspective view of the filtering cone or sleeve removed from its casing.

The same letters of reference indicate the same parts in all the figures.

In the drawings, $a$ represents a casing having an internally-screw-threaded neck $a'$, adapted to engage the threaded end of a faucet $b$. The casing $a$ has an internal flange or shoulder $a^2$ below the internally-threaded portion or socket. Below said flange is a chamber $a^3$, the diameter of which is considerably greater than that of the orifice bounded by the flange $a^2$. The lower portion of the casing $a$ is contracted to form a nozzle $a^4$, the internal diameter of which at its lower end is considerably less than that of the chamber $a$ and of the orifice bounded by the flange $a^2$.

$c$ represents a spout or outlet communicating with the chamber $a^3$ between the flange $a^2$ and the nozzle $a^4$.

$d$ represents a filter of frusto-conical form and made of wire-gauze or any other suitable filtering material. The larger end of the filter is formed to closely fit the flange $a^2$, and said end is preferably provided with a lip $d'$, formed to rest on the upper side of said flange, as shown in Fig. 1. The smaller end of the filter $d$ is formed to closely fit the lower end of the nozzle $a^4$, the said smaller end of the filter being open, so that it permits the escape of a small stream of water.

It will be seen that the water entering the casing $a$ from the faucet passes through the filter $d$. The major portion of the water escapes laterally through the meshes of the filter into the chamber $a^3$ and thence through the outlet $c$. A small part of the water, however, escapes through the lower and smaller end of the filter and carries with it such sediment as may be separated from the water that enters the chamber $a^3$ by the filter. The filter is therefore kept continually cleansed, and therefore in good working condition.

It will be seen that the flange $a^2$ at the upper end of the casing, formed to fit the larger end of the frusto-conical filter, and the contracted nozzle $a^4$ at the lower end of the casing, formed to fit the smaller end of the filter, securely support the filter at its highest portions, leaving its main portion unobstructed by contact with anything external, so that the chamber $a^3$ may extend practically the entire length of the filter, provision being thus made for the escape of the greater portion of the water which enters the filter from the faucet.

The lower end of the nozzle $a^4$ is provided with a bead $a^5$, which adapts the nozzle to be engaged with a section of hose or elastic tubing for the purpose of conducting away from the filter the water discharged through the nozzle $a^4$.

I claim—

1. The improved filter comprising a casing having at its upper end means for connection with a faucet or supply-pipe, and an inwardly-projecting flange, and at its lower end a contracted nozzle, the interior of the lower portion of which is less than that of the flange, the casing having also a chamber between the said flange and nozzle, and a lateral outlet communicating with the chamber between the flange and nozzle; and a frusto-conical filter, the larger end of which is formed to fit the flange, while the smaller end is formed to fit the lower end of the nozzle.

2. The improved filter comprising a casing having at its upper end means for connection with a faucet or supply-pipe, and an inwardly-projecting flange, and at its lower end a contracted nozzle, the internal diameter of the lower portion of which is less than that of the flange, the casing having also a chamber between the said flange and nozzle, and a lateral outlet communicating with the chamber between the flange and nozzle; and a frusto-conical filter, the larger end of which is formed to fit the flange, while the smaller end is formed to fit the lower end of the nozzle, the lower end of the nozzle being provided with means for engagement with a section of hose or flexible tubing.

In testimony whereof I have affixed my signature in presence of two witnesses.

GEORGE SCHOLL.

Witnesses:
WM. E. GALLAGHER,
C. F. BROWN.